US011051217B2

(12) United States Patent
Xu et al.

(10) Patent No.: US 11,051,217 B2
(45) Date of Patent: Jun. 29, 2021

(54) METHOD AND APPARATUS SUPPORTING LOCAL BREAKOUT IN A DUAL-CONNECTIVITY ARCHITECTURE

(71) Applicant: Samsung Electronics Co., Ltd., Suwon-si (KR)

(72) Inventors: Lixiang Xu, Beijing (CN); Hong Wang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/545,997

(22) PCT Filed: Jan. 25, 2016

(86) PCT No.: PCT/KR2016/000769
§ 371 (c)(1),
(2) Date: Jul. 24, 2017

(87) PCT Pub. No.: WO2016/117979
PCT Pub. Date: Jul. 28, 2016

(65) Prior Publication Data
US 2018/0007591 A1    Jan. 4, 2018

(30) Foreign Application Priority Data

Jan. 23, 2015  (CN) .......................... 201510035972.9

(51) Int. Cl.
*H04W 36/00*  (2009.01)
*H04W 76/10*  (2018.01)
(Continued)

(52) U.S. Cl.
CPC ... *H04W 36/0069* (2018.08); *H04W 36/0055* (2013.01); *H04W 36/08* (2013.01);
(Continued)

(58) Field of Classification Search
CPC . H04W 36/0055; H04W 76/30; H04W 76/10; H04W 36/08; H04W 76/02; H04W 76/06
See application file for complete search history.

(56) References Cited

U.S. PATENT DOCUMENTS

| 8,937,924 B2 | 1/2015 | Choi et al. |
| 10,251,050 B2 | 4/2019 | Lee et al. |

(Continued)

FOREIGN PATENT DOCUMENTS

| CN | 102244908 A | 11/2011 |
| CN | 102869122 A | 1/2013 |

(Continued)

OTHER PUBLICATIONS

ISA/KR, "International Search Report," Application No. PCT/KR2016/000769, dated May 24, 2016, Korean Intellectual Property Office, Daejeon, Korea, 3 pages.

(Continued)

*Primary Examiner* — Pakee Fang

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure provides a method of de-activating a local internet protocol access (LIPA) bearer supporting local breakout in a dual-connectivity architecture. When a master eNodeB (MeNB) determines to change a secondary eNodeB (SeNB) serving a user equipment (UE) or hand the UE over from the MeNB to an eNB, the MeNB may trigger a LIPA bearer de-activation process, and then trigger the process of change the SeNB serving the UE or hand the UE over from the MeNB to the eNB. Various examples also provide another method and an apparatus for de-activating a LIPA bearer, for bearer switch, for establishing a LIPA bearer. The methods and apparatus can establish, switch and correctly (Continued)

release local breakout bearer in a dual-connectivity architecture, so as to reduce the load of a core network of an operator.

4 Claims, 8 Drawing Sheets

(51) Int. Cl.
*H04W 76/30* (2018.01)
*H04W 76/34* (2018.01)
*H04W 36/12* (2009.01)
*H04W 36/08* (2009.01)

(52) U.S. Cl.
CPC ........... *H04W 36/12* (2013.01); *H04W 76/10* (2018.02); *H04W 76/30* (2018.02); *H04W 76/34* (2018.02); *H04W 36/125* (2018.08)

(56) References Cited

U.S. PATENT DOCUMENTS

| | | | |
|---|---|---|---|
| 10,420,166 B2 | 9/2019 | Xu et al. | |
| 2011/0274087 A1 | 11/2011 | Liang et al. | |
| 2013/0003698 A1 | 1/2013 | Olvera-Hernandez et al. | |
| 2013/0150037 A1* | 6/2013 | Jha | H04W 76/36 455/435.1 |
| 2013/0308527 A1* | 11/2013 | Chin | H04W 36/0022 370/328 |
| 2013/0337812 A1* | 12/2013 | Pekonen | H04W 36/125 455/436 |
| 2014/0029579 A1 | 1/2014 | Cho et al. | |
| 2015/0223220 A1 | 8/2015 | Zhao et al. | |
| 2015/0296366 A1* | 10/2015 | Lee | H04W 76/10 370/338 |
| 2015/0296495 A1* | 10/2015 | Yasuda | H04W 16/32 370/329 |
| 2016/0044540 A1 | 2/2016 | He | |

FOREIGN PATENT DOCUMENTS

| | | |
|---|---|---|
| CN | 103581933 A | 2/2014 |
| CN | 104105221 A | 10/2014 |
| WO | 2012093886 A2 | 7/2012 |
| WO | 2012157959 A2 | 11/2012 |
| WO | 2014069925 A1 | 5/2014 |

OTHER PUBLICATIONS

ISA/KR, "Written Opinion of the International Searching Authority," Application No. PCT/KR2016/000769, dated May 24, 2016, Korean Intellectual Property Office, Daejeon, Korea, 7 pages.

Office Action dated Nov. 16, 2020 in connection with Chinese Application No. 201510035972.9, 12 pages.

* cited by examiner

[Fig. 1]
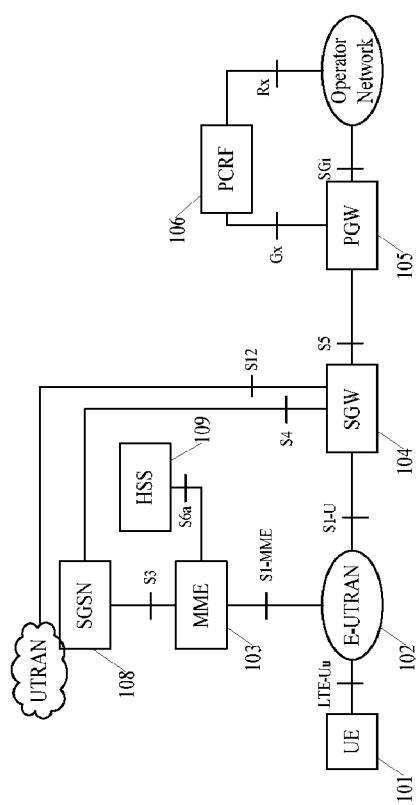

[Fig. 2]
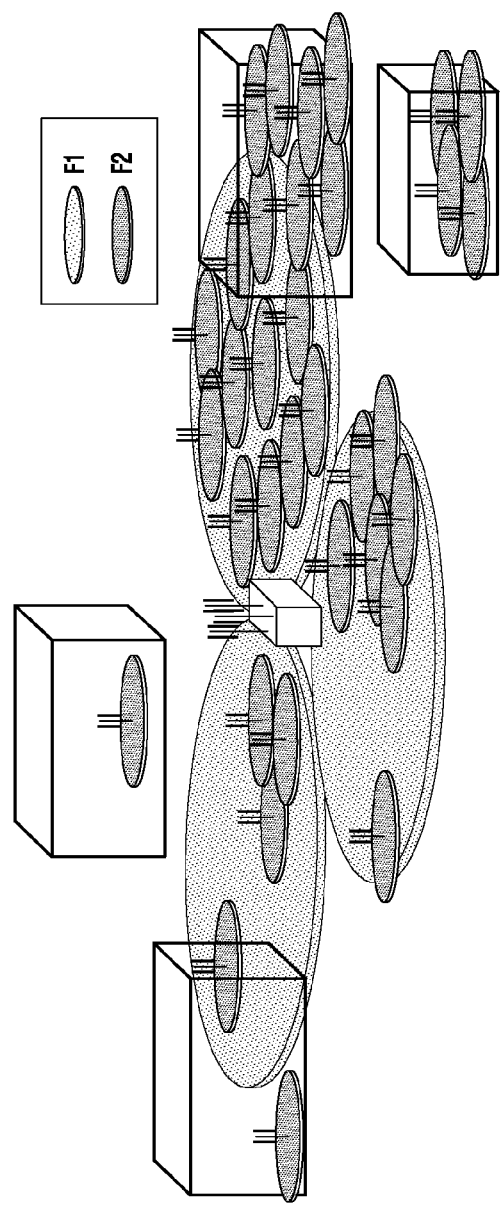

[Fig. 3]
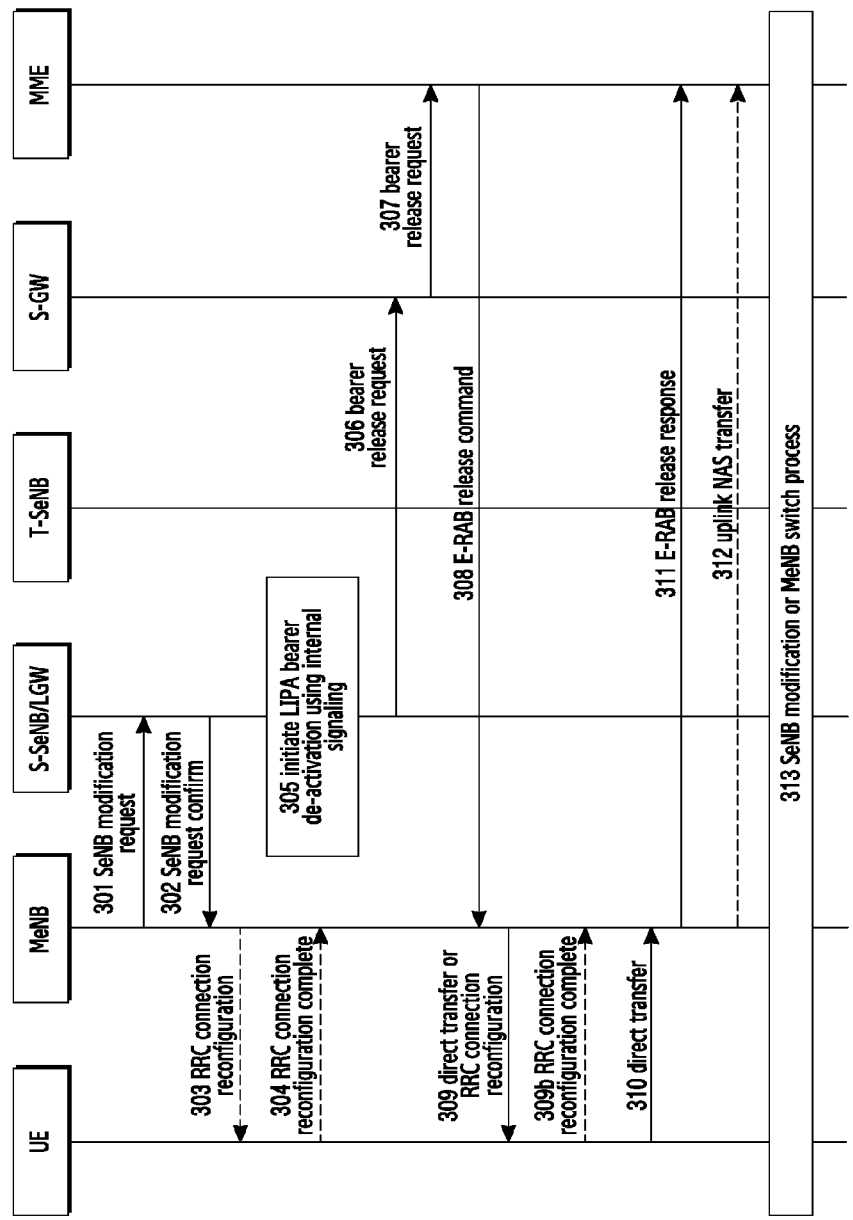

[Fig. 4]
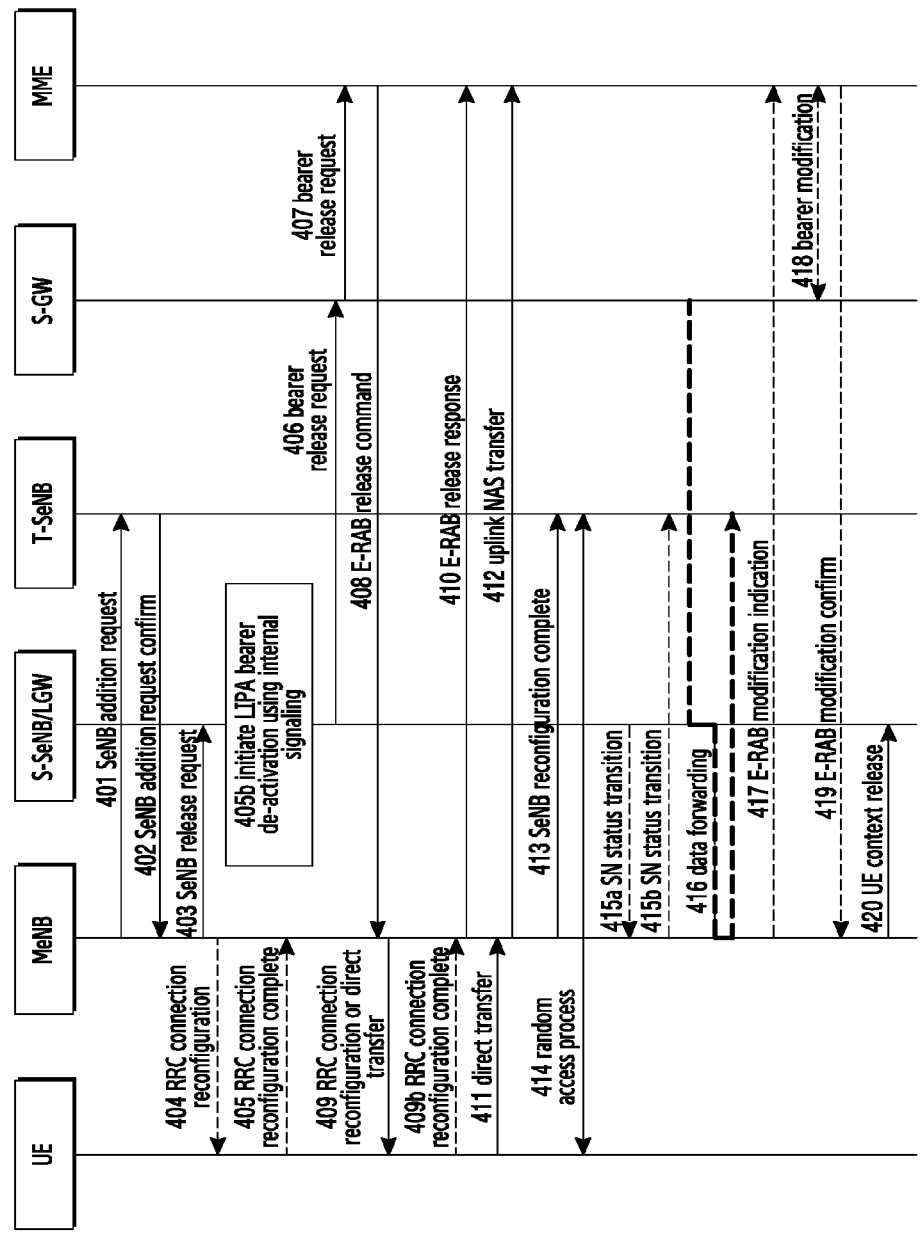

[Fig. 5]
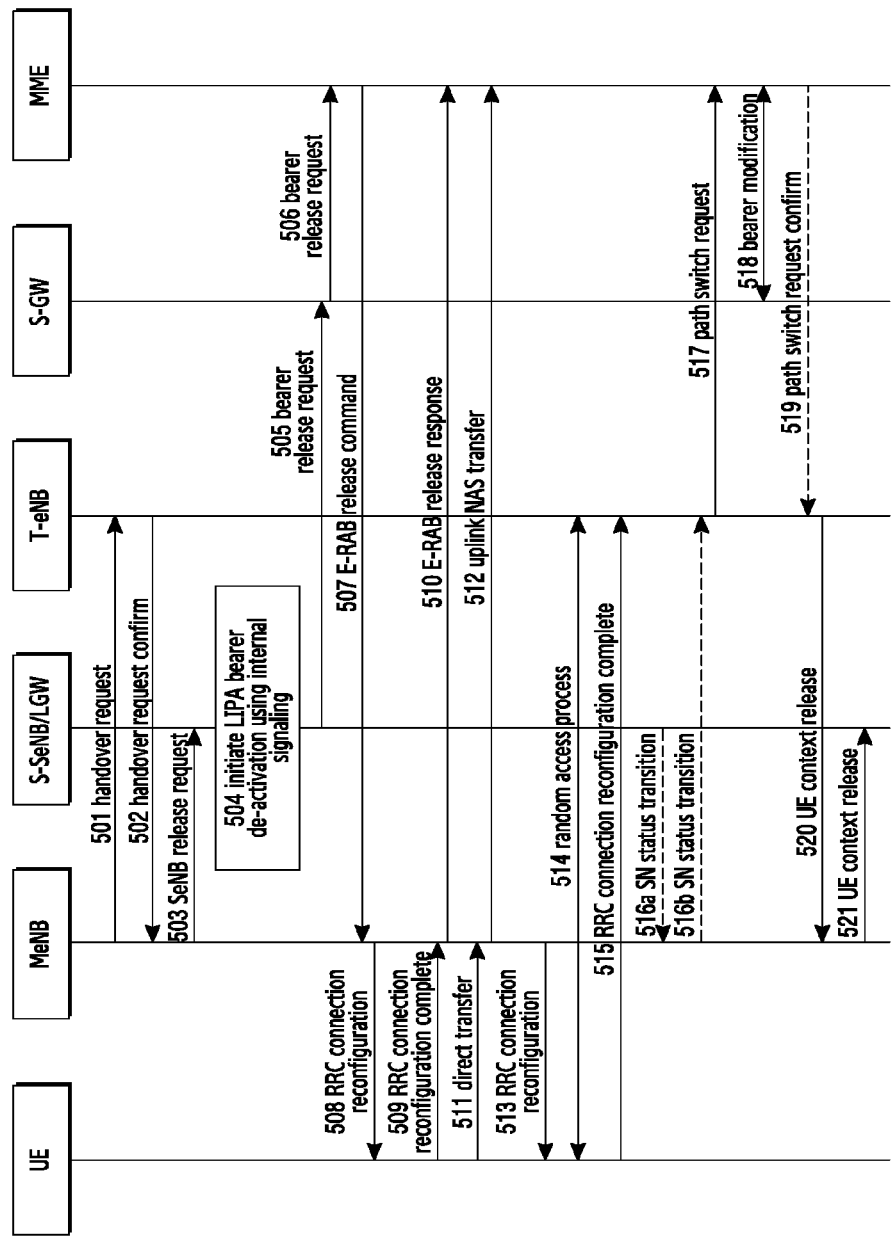

[Fig. 6]
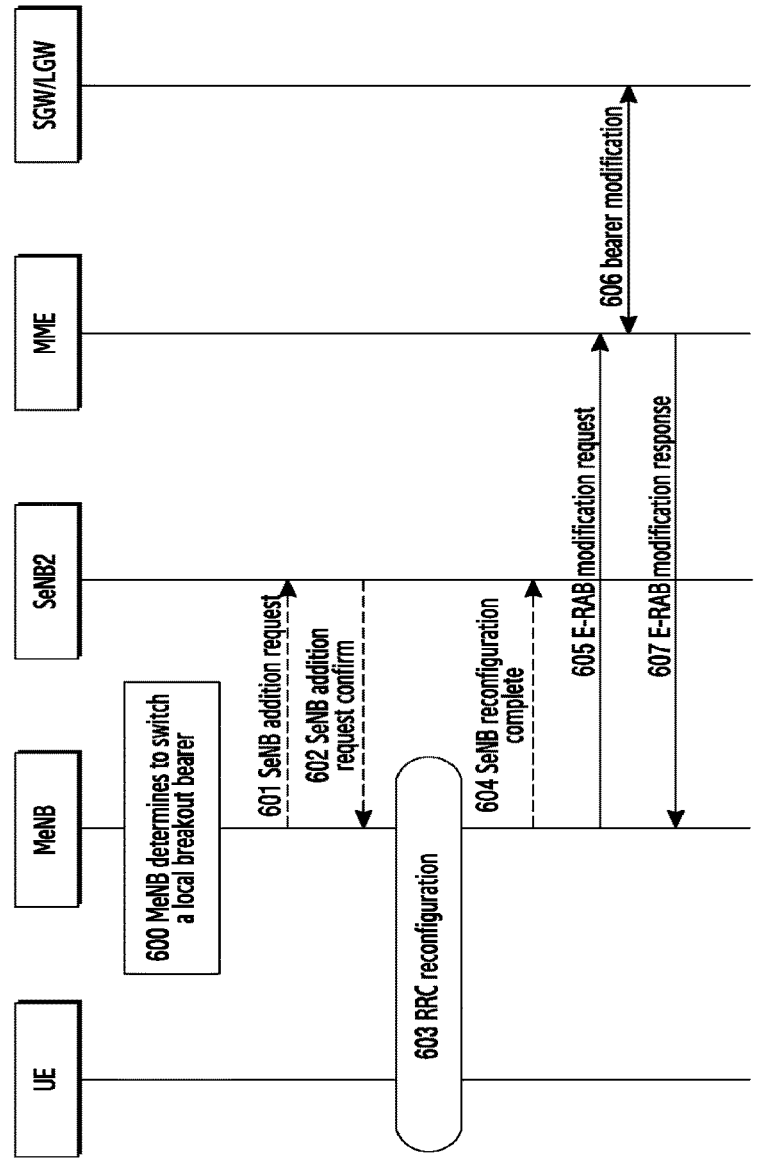

[Fig. 7]
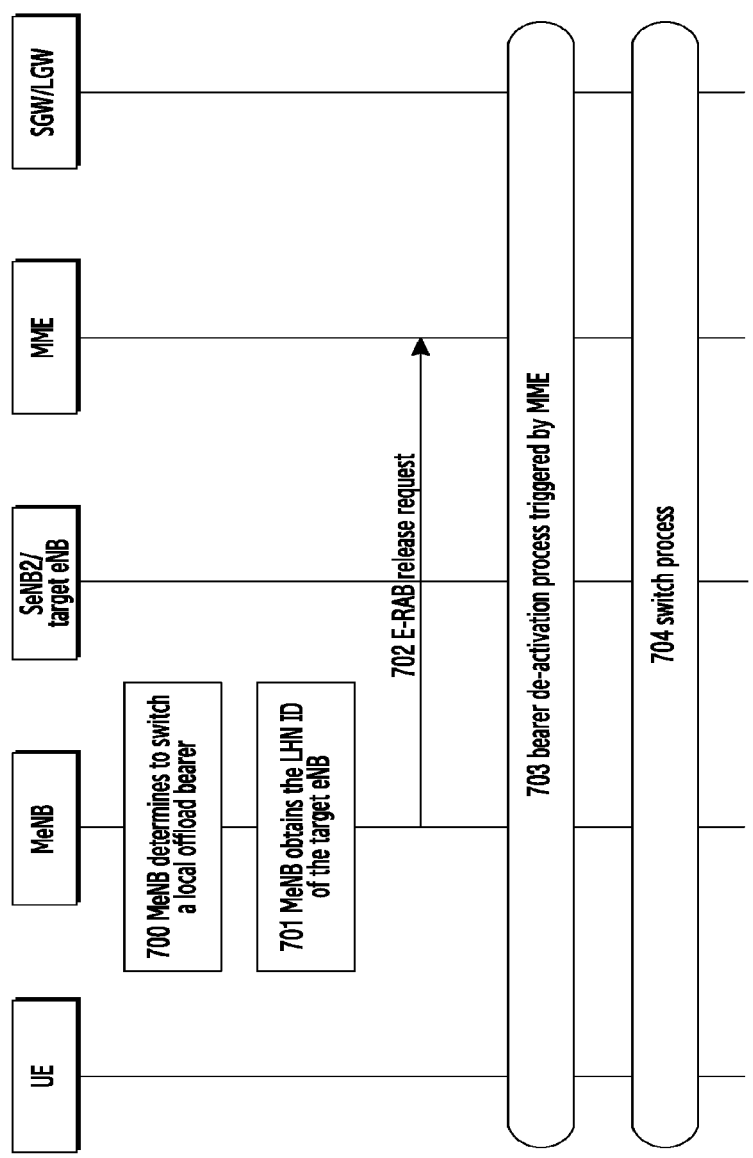

[Fig. 8]
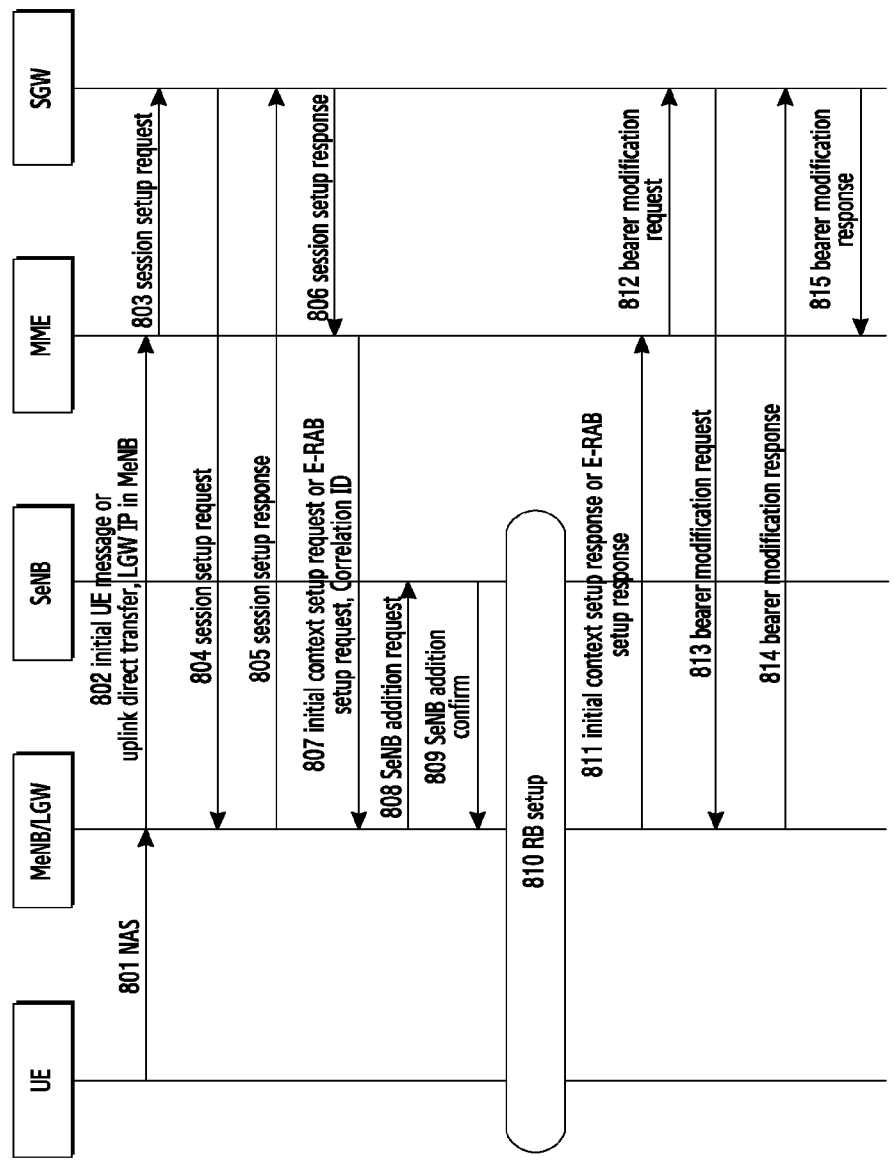

METHOD AND APPARATUS SUPPORTING LOCAL BREAKOUT IN A DUAL-CONNECTIVITY ARCHITECTURE

CROSS-REFERENCE TO RELATED APPLICATIONS

The present application claims priority under 35 U.S.C. § 365 and is a 371 National Stage of International Application No. PCT/KR2016/000769 filed Jan. 25, 2016, which claims the benefit of Chinese Patent Application No. 201510035972.9 filed Jan. 23, 2015, the disclosures of which are fully incorporated herein by reference into the present disclosure as if fully set forth herein.

TECHNICAL FIELD

The present disclosure relates to wireless communications, and particularly, to method and an apparatus for supporting local breakout in dual connectivity architecture.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LIE System'.

The 5G communication system is considered to be implemented in higher frequency (mmWave) bands, 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Modem mobile communications are tending to provide high speed transmission of multimedia services for users. FIG. 1 is a schematic diagram illustrating a structure of an architecture evolution (SAE) system.

In the system, a user equipment (UE) 101 is a terminal device which receives data. Evolved universal terrestrial radio access network (E-UTRAN) 102 is a wireless access network which includes eNodeBs/NodeBs which provide UEs with interfaces for accessing the wireless network. Mobility management entity (MME) 103 manages mobility context, session context and security information of UEs. Service gateway (SGW) 104 provides user plane functions. MME 103 and SGW 104 may reside in the same physical entity. Packet data network (PDN) gateway (PGW) 105 implements functions including accounting, lawful interception and so on, and may reside in the same physical entity with SGW 104. Policy and charging rule functions (PCRF) 106 provides Quality of Service (QoS) policies and charging rules. Serving GPRS support node (SGSN) 108 is a network node device providing routing for data transmission in the Universal Mobile Telecommunications System (UMTS). Home Subscriber Server (HSS) 109 is a home sub system of the UE, and maintains user information including a current location of the UE, the address of the serving node, user security information, packet data context of the UE, and so on.

SUMMARY

Various embodiments provide methods for supporting local breakout in a dual-connectivity architecture to implement setup, switching and correct releasing of local breakout bearer in a dual-connectivity architecture, so as to reduce the load of the core network of the operator.

According to various embodiments, a method of de-activating local internet protocol access (LIPA) bearer applicable for local breakout in a dual-connectivity architecture is provided. The method comprises triggering, by a master eNodeB (MeNB), a LIPA bearer de-activation process when determining to change a secondary eNodeB (SeNB) of a user equipment (UE) or to hand the UE over from the MeNB to an eNB, and then triggering a process of changing the SeNB of the UE or a process of handing the UE over from the MeNB to the eNB.

In an example, the MeNB may send a request for releasing a LIPA bearer to the SeNB to trigger the LIPA bearer de-activation process.

In an example, the request for releasing the LIPA bearer may include: a SeNB modification request or a defined message that includes a bearer identity of the LIPA bearer to be released.

According to various embodiments, an apparatus corresponding to the above method is provided, and applicable for supporting local breakout in a dual-connectivity architecture. The apparatus may include: a control module, a bearer de-activation module and a handover module. The control module is configured to control the bearer de-activation module to trigger a LIPA bearer de-activation process when the apparatus is a MeNB of a UE and determines to change a SeNB of the user or to hand the user over from the MeNB to an eNB, and control the handover module to trigger a process of changing the SeNB of the UE or a process of handing the UE over from the MeNB to the eNB.

According to various embodiments, a method of de-activating LIPA bearers applicable for local breakout in a dual-connectivity architecture is provided. The method may include: sending, by a MeNB to a target SeNB, a SeNB addition request which comprises information excluding information of a LIPA bearer when the MeNB determines to change a SeNB of a UE; and receiving, by the MeNB, a SeNB addition request confirm message from the target SeNB, and sending a SeNB release request to the source SeNB of the UE.

In an example, the SeNB release request sent by the MeNB to the source SeNB of the UE may include information of an evolved universal terrestrial radio access network (E-UTRAN) radio access bearer (E-RAB) to be released which includes an E-RAB identity of the E-RAB to be released and information for data forwarding; if the E-RAB is a LIPA bearer, the SeNB release request may include an indication indicative of the E-RAB to be released is the LIPA bearer.

According to various embodiments, an apparatus corresponding to the above method is provided, and is applicable for supporting local breakout in a dual-connectivity architecture. The apparatus may include: a sending module and a receiving module. The sending module is configured to send a SeNB addition request to a target SeNB when the apparatus is a MeNB of a UE and determines to change a SeNB of the UE, wherein the SeNB addition request comprises information excluding information of a LIPA bearer. The receiving module is configured to receive a SeNB addition request confirm message from the target SeNB. The sending module is further configured to send a SeNB release request to a source SeNB of the UE.

According to various embodiments, a method of de-activating a LIPA bearer applicable for local breakout in a dual-connectivity architecture is provided. The method may include: sending, by a MeNB to a target eNB, a handover request which comprises information excluding information of a LIPA bearer when the MeNB determines to hand a UE from the MeNB to the target eNB and receiving, by the MeNB, an handover request confirm message from the target eNB, and sending a SeNB release request to a source SeNB of the UE.

In an example, the SeNB release request sent by the MeNB to the source SeNB of the UE may include information of an E-RAB to be released which includes an E-RAB identity of the E-RAB to be released and information for data forwarding; when the E-RAB is a LIPA bearer, the SeNB release request may include an indication indicative of the E-RAB to be released is the LIRA bearer.

According to various embodiments, an apparatus corresponding to the above method is provided, and is applicable for supporting local breakout in a dual-connectivity architecture. The apparatus may include: a sending module and a receiving module. The sending module is configured to send a handover request to a target eNB when the apparatus is a MeNB of a UE and determines to hand the UE over from the MeNB to the target eNB, wherein the handover request comprises information excluding information of a LIPA bearer. The receiving module is configured to receive a handover request confirm message from the target eNB. The sending module is further configured to send a SeNB release request to a source SeNB of the UE.

According to various embodiments, a method of de-activating a LIPA bearer applicable for local breakout in a dual-connectivity architecture is provided. The method may include: receiving, by a SeNB, a request for releasing a LIPA bearer from a MeNB and activating a LIPA bearer de-activation process in a local gateway (LGW) through internal signaling.

In an example, the request for releasing the LIPA bearer may include: a SeNB modification request or a defined request message that includes a bearer identity of the LIPA bearer to be released.

According to various embodiments, an apparatus corresponding to the above method is provided, and is applicable for supporting local breakout in a dual-connectivity architecture. The apparatus may include: a receiving module and a bearer de-activation module. The receiving module is configured to receive a request for releasing a LIPA bearer from a MeNB when the apparatus is a SeNB of a UE. The bearer de-activation module is configured to trigger a LIPA bearer de-activation process in a LGW through internal signaling.

According to various embodiments, a method of switching bearers applicable for supporting local breakout in a dual-connectivity architecture with selected internet protocol traffic offload (SIPTO) standalone architecture is provided. The method may include: sending, by a MeNB, an E-RAB modification request to a MME when the MeNB determines to switch a local breakout bearer, wherein the E-RAB modification request comprises a local network identity of a target eNB that the local breakout bearer to be switched to or information indicative of that the local offload bearer is switched out the source local home network, or the E-RAB modification request comprises an identity of the local breakout bearer and an identity of a target local home network to which the local breakout bearer is to be switched and receiving, by the MeNB, an E-RAB modification request confirm message from the MME.

In an example, if the MeNB determines to switch the local breakout bearer from a first SeNB to a second SeNB, the method may also include: sending, by a MeNB, an E-RAB modification request to a MME when the MeNB determines to switch a local breakout bearer, wherein the E-RAB modification request comprises a local network identity of a target eNB that the local breakout bearer to be switched to or information indicative of that the local offload bearer is switched out the source local home network, or the E-RAB modification request comprises an identity of the local breakout bearer and an identity of a target local home network to which the local breakout bearer is to be switched and receiving, by the MeNB an E-RAB modification request confirm message from the MME.

According to various embodiments, an apparatus corresponding to the above method is provided, and is applicable for supporting local breakout in a dual-connectivity architecture. The apparatus may include: a bearer modification module and a receiving module. the bearer modification module is configured to send an E-RAB modification request to a MME when the apparatus serves as a MeNB of a UE and determines to switch a local breakout bearer, wherein the E-RAB modification request comprises a local network identity of a target eNB to which the local breakout bearer is to be switched or information indicative of that the local breakout bearer is to be switched out the source local home network, or the E-RAB modification request comprises an identity of the local breakout bearer and an identity of a target local home network that the local breakout bearer to be switched to and the receiving module is configured to receive an E-RAB modification request confirm message from the MME.

According to various embodiments, a method of switching bearers applicable for supporting local breakout in a dual-connectivity architecture with selected Internet Protocol traffic offload (SIPTO) standalone architecture is provided. The method may include: obtaining, by a MeNB, a local network identity of a target eNB when the MeNB determines to switch a local breakout bearer and sending, by the MeNB to a MME, an E-RAB release request which includes an E-RAB identity of a SIPTO bearer to be released if the target eNB is in a local home network different from a local home network of a source eNB.

In an example, the MeNB may obtain the local network identity of the target eNB in a manner selected from the following: sending, by the MeNB to a target SeNB, a SeNB addition request which includes a local breakout indication; receiving, by the MeNB, a SeNB addition request confirm message from the target SeNB and obtaining a local home network identity of the target SeNB from the SeNB addition request confirm message, obtaining, by the MeNB, the local home network identity of the target eNB from an X2 setup process, wherein an X2 setup request sent during the X2 setup process includes a local home network identity of an eNB that sent the X2 setup request, and an X2 setup response sent during the X2 setup process includes a local home network identity of an eNB that sent the X2 setup response and obtaining, by the MeNB, the local home network identity of the target eNB through automatic neighbor relation (ANR).

According to various embodiments, an apparatus corresponding to the above method is provided, and is applicable for supporting local breakout in a dual-connectivity architecture. The apparatus may include: an identity obtaining module and a bearer releasing module. the identity obtaining module is configured to obtain a local home network identity of a target eNB if the apparatus serves as a MeNB of a user equipment UE and determines to switch a local breakout bearer; and the bearer releasing module is configured to send to a MME, an E-RAB release request which includes an E-RAB identity of a SIPTO bearer to be released if the target eNB is in a local home network different from a local home network of a source eNB.

According to various embodiments, a method of establishing LIPA bearers is applicable for local breakout in a dual-connectivity architecture. The method may include: receiving, by a MeNB, a non-access stratum (NAS) message from a UE, sending, by the MeNB to a MME, an initial UE message or an uplink direct transfer message which includes the NAS message received from the UE; including, by the MeNB, an IP address of a collocated LGW of the MeNB if the MeNB has the collocated LGW or an IP address of a collocated LGW of a SeNB of the UE if the SeNB has the collocated LGW, receiving, by the MeNB from the MME, an initial context setup request or an E-RAB setup request message which includes a correlation ID corresponding to a LIPA, bearer to be established and sending, by the MeNB, a SeNB addition request to the SeNB.

In an example, if the bearer to be established is a secondary cell group (SCG) bearer, the MeNB may set an uplink tunnel end identity (TEID) of the SCG bearer in the SeNB addition request as the correlation ID, and set a transport layer address of the SCG bearer in the SeNB addition request as the IP address of the LGW; if the bearer to be established is a split bearer, the MeNB may allocate an uplink TEID and a transport layer address of an X2 interface to the split bearer.

According to various embodiments, an apparatus corresponding to the above method is provided, and is applicable for supporting local breakout in a dual-connectivity architecture. The apparatus may include: a first module, a second module, a third module and a fourth module. The first module is configured to receive a NAS message from a UE; the second module is configured to send to a MME an initial UE message or an uplink direct transfer message which includes the NAS message received from the UE; including an IP address of a collocated LGW of the MeNB if the MeNB has the collocated LGW or an IP address of a collocated LGW of a SeNB of the UE if the SeNB has the collocated LGW; the third module is configured to receive from the MME an initial context setup request or an E-RAB setup request message which includes a correlation ID corresponding to a LIPA bearer to be established; and the fourth module is configured to send a SeNB addition request to the SeNB.

According to the above technical mechanism, the method of supporting local breakout in a dual-connectivity architecture may implement setup, switch and correct releasing of local breakout bearer in a dual-connectivity architecture, so as to reduce the load of the core network of the operator. The technical mechanism can address the following issues.

1) De-activating a LIPA bearer during movement of UE using LIPA for local breakout in a dual-connectivity architecture.

2) Establishing a bearers if LGW is in a MeNB when SIPTO collocated architecture and LIPA are supported.

3) Implementing switching and de-activation of a bearer in SIPTO standalone architecture.

BRIEF DESCRIPTION OF THE DRAWINGS

The following description is made with reference to the accompanying drawings for a more complete understanding of the present invention and effects thereof, and the same reference numerals indicate the same parts.

FIG. 1 is a schematic diagram illustrating a structure of a conventional SAE system of the present disclosure;

FIG. 2 is a schematic diagram illustrating a scenario deployed with enhanced small cells;

FIG. 3 is a schematic diagram illustrating a first method of de-activating a LIPA bearer when LIPA is used for local breakout in a dual-connectivity architecture in accordance with an example of the present disclosure;

FIG. 4 is a schematic diagram illustrating a second method of de-activating a LIPA bearer when a bearer of a UE is switched between different SeNBs when LIPA is used for local breakout in a dual-connectivity architecture in accordance with an example of the present disclosure;

FIG. 5 is a schematic diagram illustrating a second method of de-activating a LIPA bearer when a bearer of a UE is switched from a MeNB to an eNB when LIPA is used for local breakout in a dual-connectivity architecture in accordance with an example of the present disclosure;

FIG. 6 is a schematic diagram illustrating a first method of switching bearer when SIPTO standalone architecture is used for local breakout in a dual-connectivity architecture in accordance with an example of the present disclosure;

FIG. 7 is a schematic diagram illustrating a second method of switching bearer when SIPTO standalone architecture is used for local breakout in a dual-connectivity architecture in accordance with an example of the present disclosure; and FIG. 8 is a schematic diagram illustrating a method of establishing a SIPTO bearer or a LIPA bearer supporting local breakout in a dual-connectivity architecture.

DETAILED DESCRIPTION

In order to make the objectives, technical schemes and merits of the present invention clearer, a detailed description of the present invention is hereinafter given with reference to specific embodiments.

At present, techniques supporting local breakout include local internet protocol access (LIPA) and selected internet protocol traffic offload (SIPTO). There are still problems to be solved to apply LIPA or SIPTO in a dual-connectivity architecture. For example: how to de-activate a LIPA bearer during movement of user equipment (UE)s using LIPA for local breakout in a dual-connectivity architecture; how to establish a SIPTO bearer if load gateway (LGW) is collocated in a MeNB when SIPTO collocated architecture and LIPA are supported; and how to switch and de-activate a SIPTO bearer in a SIPTO standalone architecture.

Various examples provide a technical solution to the above problems.

FIG. 3 is a schematic diagram illustrating a first method of de-activating a LIPA bearer when LIRA is used for local breakout in a dual-connectivity architecture in accordance with an example of the present disclosure. The method solves a problem of how to release a LIPA bearer when a UE is handed over between different secondary eNodeB (SeNB)s or a UE is handed over from an master eNodeB (MeNB) to an eNB when LIPA is supported in a dual-connectivity architecture and a LGW is in a SeNB. The method of FIG. 3 may include the following procedures.

At block 301, a MeNB may send a request for releasing a LIPA bearer to a SeNB.

When the MeNB determines to change a serving SeNB of a UE or initiate a handover from the MeNB to an eNB, the MeNB may determine there is a LIPA bearer established at a SeNB according to information stored previously. The MeNB may perform the procedure of block 301 to send a request to the SeNB for releasing the LIPA bearer. The request may include a bearer identity of the LIPA bearer to be released. The request may be a SeNB modification request or a defined message.

At block 302, the SeNB may send a release request confirm message to the MeNB.

The release request confirm message may include secondary cell group (SCG) configuration information of the bearer to be released. The release request confirm message may be a SeNB modification request confirm message or a defined message.

In an example, the MeNB may initiate a process to release the LIPA bearer established at the SeNB for the UE, i.e., performing procedures in blocks 303 and 304. In an example, the MeNB may initiate the process to release the LIPA bearer established at the SeNB for the UE after receiving an evolved universal terrestrial radio access network (E-UTRAN) radio access bearer (E-RAB) release command from a mobility management entity (MME), i.e., skipping blocks 303 and 304 and directly performing the procedure in block 305.

At block 303, the MeNB may send an RRC connection reconfiguration message to the UE requesting the UE to release the LIPA bearer. The RRC connection reconfiguration message may include SCG configuration information received from the SeNB.

At block 304, the UE may send an RRC connection reconfiguration complete message to the MeNB.

At block 305, the SeNB may send internal signaling to the LGW requesting to release the LIPA bearer.

At block 306, the LGW may send a bearer release request to an SGW. The message may include a hearer identity of the LIPA bearer to be released.

At block 307, the SGW may send a bearer release request to the MME. The bearer release request may include a bearer identity of the LIMA bearer to be released.

At block 308, the MME may send an E-RAB release command to the MeNB. The E-RAB release command may include the bearer identity of the LIPA bearer to be released. The E-RAB release command may include a non-access stratum (NAS) protocol data unit (PDU) for instructing the UE to release an evolved packet system (EPS) bearer.

If the MeNB has performed the procedures in blocks 303 and 304 to release the LIPA bearer at the UE, the MeNB may send a direct transfer message to the UE in block 309 to send the NAS PDU received from the MME to the UE. If the MeNB did not perform the procedures in blocks 303 and 304, the MeNB may send to the UE an RRC connection reconfiguration message which includes SCG configuration information received from the SeNB.

At block 309b, the UE may send an RRC connection reconfiguration complete message to the MeNB. This procedure is performed only when the UE has received an RRC connection reconfiguration message.

At block 310, the UE may send a direct transfer message to the MeNB. The direct transfer message may include the NAS message of delete EPS bearer context accept.

If the MeNB has performed the procedures in blocks 303 and 304 to release the LIPA bearer at the UE, the procedures in blocks 309, 309b and 310 may be skipped.

At block 311, the MeNB may send an E-RAB release response to the MME. If the MeNB has performed the procedures in blocks 303 and 304 to release the LIPA bearer at the UE, the MeNB may perform this procedure after receiving the release command in block 308.

At block 312, the MeNB may send an uplink NAS transfer message to the MME to send the NAS message received from the UE to the MME.

At block 313, the MeNB may initiate a SeNB change process or a handover process from the MeNB to the eNB.

According to the method as shown in FIG. 3, when the MeNB determines to change the serving SeNB of the UE or to hand the UE over from the MeNB to the eNB, the MeNB may firstly send a message to the SeNB to initiate a LIPA bearer de-activation process, then initiate the process for changing the SeNB or for handover from the MeNB to the eNB so as to timely release the LIPA bearer.

Various examples also provide an apparatus corresponding to the method of FIG. 3. The apparatus is applicable for supporting local breakout in a dual-connectivity architecture. The apparatus may include: a control module, a bearer de-activation module and a handover module.

The control module is configured to control the bearer de-activation module to trigger a LIPA bearer de-activation process when the apparatus is a MeNB of a UE and determines to change a serving SeNB of the UE or to hand the UE over from the MeNB to an eNB, and control the handover module to trigger a process of changing the serving SeNB of the UE or a process of handing the UE over from the MeNB to the eNB.

In an example, the bearer de-activation module may send a request for releasing a LIPA bearer to the SeNB to trigger the LIPA bearer de-activation process.

In an example, the request message for releasing the LIPA bearer may be: a SeNB modification request or a defined message which includes a bearer identity of the LIPA bearer to be released.

FIG. 4 is a schematic diagram illustrating a second method of de-activating a LIPA bearer when a LIPA bearer of a UE is switched between different SeNBs when LIPA is used for local breakout in a dual-connectivity architecture in accordance with an example of the present disclosure. The method solves a problem of how to release a LIPA bearer when a UE is handed over between different SeNBs when LIPA is supported in a dual-connectivity architecture and a LGW is in a SeNB. The method of FIG. 4 may include the following procedures.

At block 401, a MeNB may send a SeNB addition request to a target SeNB.

When the MeNB determines to change the serving SeNB of the UE, the MeNB may determine there is a LIPA bearer established at the SeNB according to information previously stored, and send the SeNB addition request to the target SeNB. The SeNB addition request may include bearer information excluding information of the LIPA bearer.

At block 402, the target SeNB may send a SeNB addition request confirm message to the MeNB.

At block 403, the MeNB sends a SeNB release request to the source SeNB.

The SeNB modification request may include information of an E-RAB to be released. The information of the E-RAB to be released may include an E-RAB identity of the E-RAB to be released and information for data forwarding. If the bearer to be released is a LIPA bearer, the SeNB modification request may also include information indicating the E-RAB to be released is a LIPA bearer.

In an example, the MeNB may initiate a process for reconfiguring the UE, i.e., performing the procedures in blocks 404 and 405 denoted by dotted lines. In an example, the MeNB may initiate the process for reconfiguring the UE after receiving an E-RAB release command sent by an MME, i.e., skipping the procedures in blocks 404 and 405 denoted by dotted lines and performing the procedure in block 405b directly.

At block 404, the MeNB may send an RRC connection reconfiguration message to the UE requesting the UE to modify configurations of the bearer and/or to release the LIPA bearer. The RRC connection reconfiguration message may include SCG configuration information received from the SeNB.

At block 405, the UE may send an RRC connection reconfiguration complete message to the MeNB.

At block 405b, the SeNB may send internal signaling to an LGW requesting to release the LIPA bearer.

At block 406, the LGW may send a bearer release request to a service gateway (SGW). The bearer release request may include a bearer identity of the LIPA bearer to be released.

At block 407, the SGW may send a bearer release request to the MME. The bearer release request may include a bearer identity of the LIPA bearer to be released.

At block 408, the MME may send an E-RAB release command to the MeNB. The E-RAB release command may include the E-RAB identity of the E-RAB to be released. The E-RAB release command may also include a NAS PDU for instructing the UE to release an EPS bearer.

If the MeNB has performed the procedures in blocks 404 and 405 to reconfigure the LIPA bearer at the UE, the MeNB may send a direct transfer message to the UE in block 409 to send the NAS PDU received from the MME to the UE. If the MeNB did not perform the procedures in blocks 404 and 405, the MeNB may send to the UE an RRC connection reconfiguration message which includes the SCG configuration information received from the SeNB.

At block 409b, the UE may send an RRC connection reconfiguration complete message to the MeNB. This procedure is performed only when the UE has received an RRC connection reconfiguration message.

At block 410, the MeNB may send an E-RAB release response to the MME if the MeNB has performed the procedures in blocks 404 and 405 to reconfigure the bearer at the UE, the MeNB may perform this procedure after receiving the release command in block 408.

At block 411, the UE may send a direct transfer message to the MeNB. The direct transfer message may include the NAS message of delete EPS bearer context accept.

If the MeNB has performed the procedures in blocks 404 and 405 to configure the bearer at the UE, the procedures in blocks 409, 409b and 411 may be skipped.

At block 412, the MeNB may send an uplink NAS transfer message to the MME to send the NAS message received from the UE to the MME.

At block 413, the MeNB may send a SeNB reconfiguration complete message to the target SeNB.

At block 414, the UE may perform random access to be synchronized with the target SeNB.

At block 415, the serving SeNB may send a sequence number (SN) status transfer message to the MeNB, and the MeNB may send the SN status transfer message to the target SeNB.

At block 416, data on an SCG bearer may be forwarded by the source SeNB. The source SeNB may start forwarding data after receiving the SeNB release request.

At blocks 417 to 419, if a bearer is configured to be an SCG bearer at the source SeNB, the MeNB may initiate a path switch process. In an example, the MeNB may send an E-RAB modification indication to the MME. The MME may modify the bearer with the SGW, and return an E-RAB modification confirm message to the MeNB.

At block 420, the MME may send a UE context release command to the source SeNB.

According to the method as shown in FIG. 4, when a UE is handed over between different SeNBs, the MeNB may configure in the target SeNB only the bearers other than LIPA bearer. The source SeNB may instruct the LGW to initiate a LIPA bearer de-activation process through internal signaling after receiving a SeNB release request, so as to timely release the LIPA bearer.

Various examples provide an apparatus corresponding to the method as shown in FIG. 4. The apparatus is applicable for supporting local breakout in a dual-connectivity architecture. The apparatus may include: a sending module and a receiving module.

The sending module is configured to send a SeNB addition request to a target SeNB when the apparatus is a MeNB of a UE and determines to change a serving SeNB of the UE, wherein the SeNB addition request comprises bearer information excluding information of a LIPA bearer.

The receiving module is configured to receive a SeNB addition request acknowledgement from the target SeNB.

The sending module is further configured to send a SeNB release request to a source SeNB of the UE.

In an example, the SeNB release request sent by the sending module to the source SeNB of the UE may include information of an E-RAB to be released which includes an E-RAB identity of the E-RAB to be released and information for data forwarding; if the E-RAB is a LIPA bearer, the SeNB release request may include an indication to indicate that the E-RAB to be released is the LIPA bearer.

FIG. 5 is a schematic diagram illustrating a second method of de-activating a LIPA bearer when a bearer of a UE is switched from a MeNB to an eNB when LIPA is used for local breakout in a dual-connectivity architecture in accordance with an example of the present disclosure. The method of FIG. 5 may include the following procedures.

At block 501, a MeNB may send a handover request to a target eNB.

When the MeNB determines to hand a UE over to the target eNB, the MeNB may determine there is a LIPA bearer established at the SeNB according to information previously stored, and send the handover request to the target eNB. The handover request may include information excluding information of the LIPA bearer.

At block 502, the target eNB may send a handover request confirm message to the MeNB.

At block 503, the MeNB may send a SeNB release request to the source SeNB. The SeNB release request may include information of an E-RAB to be released. The information of the E-RAB to be released may include an E-RAB identity of the E-RAB to be released and information for data forwarding. If the bearer to be released is a LIPA bearer, the SeNB release request may also include information indicating the E-RAB to be released is a LIPA bearer.

At block 504, the source SeNB may send internal signaling to an LGW requesting the LGW to release the LIPA bearer.

At block 505, the LGW may send a bearer release request to an SGW. The bearer release request may include a bearer identity of the LIPA bearer to be released.

At block 506, the SGW may send a bearer release request to an MME. The bearer release request may include a bearer identity of the LIPA bearer to be released.

At block 507, the MME may send an E-RAB release command to the MeNB. The E-RAB release command may include the E-RAB identity of the E-RAB to be released. The E-RAB release command may also include a NAS PDU for instructing the UE to release an EPS bearer.

At block 508, the MeNB may send an RRC connection reconfiguration message to the UE. The RRC connection reconfiguration message may include the NAS message received from the MME.

At block 509, the UE may send an RRC connection reconfiguration complete message to the MeNB.

At block 510, the MeNB may send an E-RAB release response to the MME.

At block 511, the UE may send a direct transfer message to the MeNB. The direct transfer message may include the NAS message of delete EPS bearer context accept.

At block 512, the MeNB may send an uplink NAS transfer message to the MME to send the NAS message received from the UE to the MME.

At block 513, the MeNB may send an RRC connection reconfiguration message to the UE requesting the UE to modify configurations of the bearer.

At block 514, the UE may perform random access to be synchronized with the target SeNB.

At block 515, the UE may send an RRC connection reconfiguration complete message to the target eNB.

At block 516, the source SeNB may send an SN status transfer message to the MeNB, and the MeNB may send the SN status transfer message to the target eNB.

At block 517, the target eNB may send a path switch request to an MME.

At block 518, the MME may initiate a bearer modification process with SGW.

At block 519, the MME may send a path switch request confirm message to target eNB.

At block 520, the target eNB may send a UE context release command to the MeNB.

At block 521, the MeNB may send a UE context release message to the SeNB.

According to the method as shown in FIG. 5, when a UE is handed over from the MeNB to the eNB, the MeNB may configure in the target SeNB only the bearers other than LIPA bearer. The source SeNB may instruct the LGW to initiate a LIPA bearer de-activation process through internal signaling after receiving a SeNB release request, so as to timely release the LIPA bearer.

Various examples provide an apparatus corresponding to the method as shown in FIG. 5. The apparatus is applicable for supporting local breakout in a dual-connectivity architecture. The apparatus may include: a sending module and a receiving module.

The sending module is configured to send a SeNB handover request to a target eNB when the apparatus is a MeNB of a UE and determines to hand the UE over from the MeNB to the target eNB, wherein the SeNB handover request comprises information excluding information of a LIPA bearer.

The receiving module is configured to receive a SeNB handover request confirm message from the target eNB.

The sending module is further configured to send a SeNB release request to a source SeNB of the UE.

In an example, the SeNB release request sent by the sending module to the source SeNB of the UE may include information of an E-RAB to be released which includes an E-RAB identity of the E-RAB to be released and information for data forwarding; when the E-RAB is a LIPA bearer, the SeNB release request may include an indication indicative of the E-RAB to be released is the LIPA bearer.

Various examples provide an apparatus corresponding to the method as shown in FIGS. 3-5. The apparatus is applicable for supporting local breakout in a dual-connectivity architecture. The apparatus may include: a receiving module and a bearer de-activation module.

The receiving module is configured to receive a request for releasing a LIPA bearer from a MeNB when the apparatus is a SeNB of a UE.

The hearer de-activation module is configured to trigger a LIPA bearer de-activation process in a LGW through internal signaling.

FIG. 6 is a schematic diagram illustrating a first method of switching bearer when SIPTO standalone architecture is used for local breakout in a dual-connectivity architecture in accordance with an example of the present disclosure. The method adopts a SIPTO standalone architecture. Some procedures irrelevant to implementation of the technical mechanism are omitted in FIG. 6. The method may include the following procedures.

At block 600, a MeNB determines to switch a local breakout hearer.

In an example, the MeNB may determine to switch the local breakout bearer to another SeNB or to the MeNB in response to a determination that the SeNB (e.g., SeNB1, or first SeNB) becomes unavailable according to measurement results of the UE or the SeNB has too much load.

At block 601, if the MeNB determines to switch the local breakout bearer to another SeNB (e.g., SeNB2, or second SeNB), the MeNB may send a SeNB addition request to SeNB2.

The SeNB addition request may include a local breakout indication SeNB2 may determine according to the local breakout indication whether to send a local network identity of SeNB2 to the MeNB at block 602.

At block 602, SeNB2 may allocate resources, and send a SeNB addition request confirm message to the MeNB.

The SeNB addition request confirm message may include the local home network identity of SeNB2.

If the MeNB determines to switch the local breakout bearer to the MeNB, the procedure in blocks 601, 602 and 604 may be skipped.

At block 603, the MeNB may send an RRC reconfiguration request to the UE, and the UE may send an RRC reconfiguration response to the MeNB.

At block 604, the MeNB may send a SeNB reconfiguration complete message to SeNB2.

At block 605, the MeNB may send an E-RAB modification request to an MME. In an example, the MeNB may send the local home network identity of the target eNB (SeNB2 or MeNB) or information indicating the local breakout bearer is to be switched out of the source local network to the MME via the E-RAB modification request. In an example, the MeNB may send the identity of the local breakout bearer, or the identity of the local breakout bearer and the identity of the target local home network to which the local breakout bearer is to be switched to the MME. Therefore, the local home network identity in the E-RAB modification request may be corresponding to each bearer. The information of the modified bearer may include the identity of the bearer to be modified, and the identity of the target local home network to which the bearer is to be switched.

In an example, the MeNB may obtain the local home network identity of SeNB2 during an X2 setup process. In an example, the MeNB may obtain the local home network identity of SeNB2 in block 602. In an example, the MeNB may have the local home network identity of the source SeNB (e.g., SeNB1) and the local home network identity of the target SeNB (e.g., SeNB2), and send the indication of switching the bearer out of the local network to the MME. The MeNB may send the indication of switching the bearer out of the local network to the MME only when the bearer of the UE is a local breakout bearer and the local breakout bearer is to be switched out of the local home network. The indication of switching the bearer out of the local home network may be sent for each bearer. The information of the modified bearer may include the identity of the bearer to be modified, and the identity of the local home network to which the bearer is to be switched.

At block 606, the MME may send a bearer modification request to the SGW/LGW, and the SGW/LGW may send a bearer modification response to the MME.

At block 607, the MME may send an E-RAB modification confirm message to the MeNB.

If the bearer is a local breakout bearer, the MME may initiate a local breakout bearer de-activation process in response to a determination that the local breakout bearer is switched out of the local home network according to information received from the MeNB, e.g., according to the local home network identity of the target eNB to which the bearer is to be switched or the indication of switching the local breakout bearer out of the local home network. The MME may perform or skip the procedures in blocks 606 and 607 when initiating the local bearer de-activation process. The bearer de-activation process is not elaborated herein.

Various examples provide an apparatus corresponding to the method as shown in FIG. 6. The apparatus is applicable for supporting local breakout in a dual-connectivity architecture with a SIPTO standalone architecture. The apparatus may include: a bearer modification module and a receiving module.

The bearer modification module is configured to send an E-RAB modification request to an MME when the apparatus serves as a MeNB of a UE and determines to switch a local breakout bearer, wherein the E-RAB modification request comprises a local home network identity of a target eNB to which the local breakout bearer is to be switched or information indicative of that the local breakout bearer is to be switched out the source local home network, or the E-RAB modification request comprises an identity of the local breakout bearer and an identity of a target local home network that the local breakout bearer to be switched to.

The receiving module is configured to receive an E-RAB modification request acknowledgement from the MME.

In an example, if the MeNB determines to switch the local breakout bearer from a first SeNB to a second SeNB, the method may also include:

before sending the E-RAB modification request to the MME, sending, by the MeNB to the second SeNB, a SeNB addition request which includes a local breakout indication; and receiving, by the MeNB from the second SeNB, a SeNB addition request acknowledgement, and obtaining a local home network identity of the second SeNB from the SeNB addition request acknowledgement.

FIG. 7 is a schematic diagram illustrating a second method of switching bearer when SIPTO standalone architecture is used for local breakout in a dual-connectivity architecture in accordance with an example of the present disclosure. The method is a process of implementing local breakout bearer de-activation when a local breakout bearer is to be switched (including switching from a MeNB to a SeNB, or from a SeNB to a MeNB, or from a SeNB to another SeNB) when a SIPTO standalone architecture is adopted. Some procedures irrelevant to implementation of the technical mechanism are omitted in FIG. 7. The method may include the following procedures.

At block 700, a MeNB determines to switch a local breakout bearer.

For example, it may be determined that the SeNB (e.g., SeNB1, or first SeNB) to which the local breakout bearer belongs becomes unavailable according to measurement results of the UE or becomes overloaded. The MeNB determines to switch the local breakout bearer to a second SeNB or to the MeNB.

At block 701, the MeNB may obtain the local network identity (LHN ID) of the target eNB.

The MeNB may obtain the LHN ID of the target eNB in an X2 setup process. In this manner, an X2 setup request and an X2 setup response may include the LHN ID of the source eNB (i.e., the eNB that sends either of the two messages).

The MeNB may obtain the LHN ID of the target eNB in a SeNB addition process. In this manner, the SeNB addition request confirm message sent during the SeNB addition process (e.g., procedures in blocks 602 as shown in FIG. 6) may include the LHN ID of the SeNB.

The MeNB may also obtain the LHN ID of the target eNB from automatic neighbor relation (ANR). In this manner, an eNB may broadcast the LHN ID of the eNB, and a UE may obtain the LHN ID of a neighboring eNB and send the LHN ID to the source eNB of the UE.

At block 702, the MeNB may obtain the LHN ID of the source eNB and the LHN ID of the target eNB to which the bearer is to be switched. If the source eNB is in a different local network with the target eNB (i.e., they have different LHN IDs), the MeNB may send an E-RAB release request to an MME. The SeNB release request may include an E-RAB ID of a SIPTO bearer to be released.

At block 703, the MME may initiate a process for de-activating the SIPTO bearer.

At block 704, the MeNB may initiate a switch process. The switch process may refer to a process of switching a bearer (e.g., switching a bearer from the MeNB to a SeNB, or from a first SeNB to a second SeNB, or from a SeNB to the MeNB).

According to the method as shown in FIG. 7, the MeNB may initiate the de-activation of the SIPTO bearer to avoid a waste of resources resulted from switching the SIPTO bearer to an eNB and then de-activating the SIPTO bearer.

An apparatus corresponding to the method as shown in FIG. 7 is provided. The apparatus may be applicable for supporting local breakout in a dual-connectivity architecture. The apparatus may include: an identity obtaining module and a bearer releasing module.

The identity obtaining module is configured to obtain a local network identity of a target eNB if the apparatus serves as a MeNB of a UE and determines to switch a local breakout bearer.

The bearer releasing module is configured to send to an MME, an E-RAB release request which includes an E-RAB identity of a SIPTO bearer to be released if the target eNB is in a local network different from a local network of a source eNB.

In an example, the MeNB may obtain the local network identity of the target eNB in a manner selected from the following: sending, by the MeNB to a target SeNB, a SeNB addition request which includes a local breakout indication; receiving, by the MeNB, a SeNB addition request acknowledgement from the target SeNB and obtaining a local network identity of the target SeNB from the SeNB addition request confirm message;

obtaining, by the MeNB, the local network identity of the target eNB from an X2 setup process, wherein an X2 setup request sent during the X2 setup process includes a local network identity of an eNB that sent the X2 setup request, and an X2 setup response sent during the X2 setup process includes a local network identity of an eNB that sent the X2 setup response; and obtaining, by the MeNB, the local network identity of the target eNB through ANR.

FIG. 8 is a schematic diagram illustrating a method of establishing a SIPTO bearer or a LIPA bearer in a dual-connectivity architecture supporting a SIPTO collocated architecture. The method is for establishing a LIPA bearer or a SIPTO bearer in a dual-connectivity architecture supporting LIPA or a SIPTO collocated architecture. The method of FIG. 8 may include the following procedures.

At block 801, the LTE may send a NAS message to the MeNB via an RRC message.

At block 802, the MeNB may send an initial UE message or an uplink direct transfer message to an MME. The message may include the NAS message received from the UE.

If the MeNB has a collocated LGW, the MeNB may send the LGW IP of the collocated LGW to the MME via the initial UE message or the uplink direct transfer message. If the SeNB of the UE has a collocated LGW, the MeNB may send the LGW IP of the collocated LGW at the SeNB to the MME via the initial UE message or the uplink direct transfer message. In an example, the SeNB of the UE is the SeNB that the MeNB configured a bearer at the SeNB for the UE. In another example, the SeNB of the UE may be the SeNB that the MeNB detects the UE is in the coverage of the SeNB according to measurement results of the UE.

If the MeNB has a collocated LGW, the MeNB may send the LGW IP of the collocated LGW at the MeNB to the MME. If the MeNB does not have a collocated LGW, the MeNB may send an LGW IP of the SeNB of the UE to the MME.

At block 803, the MME may send a session setup request to the SGW. According to the NAS message received, if the UE has requested a local breakout service, e.g., a SIPTO service or a LIPA service in the local network, the MME may determine whether to establish a SIPTO bearer or a LIPA bearer according to subscription information of the UE and the LGW IP received from the MeNB. The MME may select a LGW for the UE according to a principle after determining to establish a SIPTO bearer or a LIPA bearer for the UE.

At block 804, the SGW may send a session setup request to the LGW.

At block 805, the LGW may send a session setup response to the SGW.

At block 806, the SGW may send a session setup response to the MME.

At block 807, the MME may send an initial context setup request or an E-RAB setup request to the MeNB. The initial context setup request or the E-RAB setup request may include a correlation ID of the SIPTO bearer or the LIPA bearer to be established.

At block 808, the MeNB may send a SeNB addition request to a SeNB. The MeNB sets an uplink TEID and transport layer address information of the bearer in the SeNB addition request according to whether the bearer to be established is an SCG bearer or a split bearer. If the bearer to be established is a secondary cell group (SCG) bearer, the MeNB may set an uplink tunnel end identity (TEID) of the SCG bearer in the SeNB addition request as the correlation ID, and set a transport layer address of the SCG bearer in the SeNB addition request as the IP address of the LGW. If the bearer to be established is a split bearer, the MeNB may allocate an uplink TEID and a transport layer address of an X2 interface to the split bearer.

As such, user plane data on an SCG bearer is forwarded from the LGW at the MeNB to the SeNB, and user plane data on a split bearer is forwarded from the LGW at the MeNB to the MeNB (e.g., PDCP processing) and then to the SeNB.

At block 809, the SeNB may send a SeNB addition request confirm message to the MeNB, and the SeNB may allocate resources.

The SeNB addition request confirm message may include the local network identity of the SeNB.

At block 810, an RB bearer of over air interface may be established for the UE.

At block 811, the MeNB may send an initial context setup response or an E-RAB setup response to the MME.

At block 812, the MME may send a bearer modification request to the SGW.

At block 813, the SGW may send a bearer modification request to the LGW.

At block 814, the LGW may send a bearer modification response to the SGW.

At block 815, the SGW may send a bearer modification response to the MME.

The method as shown in FIG. 8 can set up a SIPTO bearer or a LIPA bearer for a UE, especially when the LGW is in the MeNB.

Various examples also provide an apparatus corresponding to the method of FIG. 8. The apparatus is applicable for supporting local breakout in a dual-connectivity architecture. The apparatus may include: a first module, a second module, a third module and a fourth module.

The first module is configured to receive a non-access stratum (NAS) message from a user equipment (UE);

The second module is configured to send to a mobility management entity (MME) an initial UE message or an uplink direct transfer message which includes the NAS message received from the UE; including in the message an IP address of a collocated local gateway (LGW) of the MeNB if the MeNB has the collocated LGW or an IP address of a collocated LGW of a secondary eNodeB (SeNB) of the UE if the SeNB has the collocated LGW;

The third module is configured to receive from the MME an initial context setup request or an E-UTRAN Radio Access Bearer (E-RAB) setup request message which includes a correlation ID corresponding to a local Internet protocol access (LIPA) bearer or a SIPTO bearer to be established; and The fourth module is configured to send a SeNB addition request to the SeNB.

In an example, if the bearer to be established is a SCG bearer, the fourth module may set an uplink TEID of the SCG bearer in the SeNB addition request as the correlation ID, and set a transport layer address of the SCG bearer in the SeNB addition request as the IP address of the LGW; if the bearer to be established is a split bearer, the fourth module may allocate an uplink TED and a transport layer address of an X2 interface to the split bearer.

Various examples provide methods for supporting local breakout in a dual-connectivity architecture to implement setup, switching and correct releasing of local breakout bearer in a dual-connectivity architecture, so as to reduce the load of the core network of the operator.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method of a master eNodeB (MeNB) for de-activating a local internet protocol access (LIPA) bearer, applicable for local breakout in a dual-connectivity architecture, the method comprising:
   determining to change a serving secondary eNodeB (SeNB) for providing a dual-connectivity service to a user equipment (UE) with the MeNB or to initiate a handover of the UE from the MeNB to an eNB for providing the dual-connectivity service to the UE with the SeNB;
   sending, from the MeNB to the serving SeNB, a request to release a LIPA bearer, causing the serving SeNB to send internal signaling to a local gateway (LGW) comprised in the serving SeNB to activate a LIPA bearer de-activation process of the LGW;
   receiving, at the MeNB from a mobility management entity (MME), a release command including a bearer identity of the LIPA bearer to be released based on the LIPA bearer de-activation process initiated at the LGW of the SeNB; and
   sending, to the UE, an RRC connection reconfiguration message to release the LIPA bearer.

2. The method of claim 1, further comprising:
   receiving, from the serving SeNB, a request confirmation message in response to the request; and
   receiving, from the UE, an RRC connection reconfiguration complete message in response to the RRC connection reconfiguration message.

3. The method of claim 1, further comprising:
   receiving, from a mobility management entity (MME), a universal terrestrial radio access network radio access bearer (E-RAB) release command which includes a non-access stratum (NAS) protocol data unit (PDU) for instructing the UE to release an evolved packet system (EPS) bearer;
   transmitting, to the UE, a direct transfer message which includes the NAS PDU; and
   receiving, from the UE, another direct transfer message which includes a NAS message of delete EPS bearer context accept.

4. A master eNodeB (MeNB) for de-activating a local internet protocol access (LIPA) bearer, applicable for local breakout in a dual-connectivity architecture, the MeNB comprising:
   a transceiver; and
   a processor coupled to the transceiver and configured to:
   determine to change a serving secondary eNodeB (SeNB) for providing a dual-connectivity service to a user equipment (UE) with the MeNB or to initiate a handover of the UE from the MeNB to an eNB for providing the dual-connectivity service to the UE with the SeNB;
   send, from the MeNB to the serving SeNB, a request to release a LIPA bearer, causing the serving SeNB to send internal signaling to a local gateway (LGW) comprised in the serving SeNB to activate a LIPA bearer de-activation process of the LGW;
   receive, at the MeNB from a mobility management entity (MME), a release command including a bearer identity of the LIPA bearer to be released based on the LIPA bearer de-activation process initiated at the LGW of the SeNB; and
   send, to the UE, an RRC connection reconfiguration message to release the LIPA bearer.

* * * * *